United States Patent [19]

Sekmakas

[11] 3,860,549

[45] Jan. 14, 1975

[54] THERMOSETTING COATING COMPOSITIONS COMPRISING METHYLOLATED AMIDE INTERPOLYMERS OF HIGH ACID CONTENT IN COMBINATION WITH LOW MOLECULAR WEIGHT POLYHYDRIC ALCOHOLS

[75] Inventor: Kazys Sekmakas, Chicago, Ill.

[73] Assignee: DeSoto, Inc., Des Plaines, Ill.

[22] Filed: July 30, 1973

[21] Appl. No.: 383,716

Related U.S. Application Data

[63] Continuation-in-part of Ser. No. 204,721, Dec. 3, 1971, abandoned.

[52] U.S. Cl. ............... 260/29.6 TA, 260/29.6 ME, 260/31.6, 260/33.2 R, 260/33.4 R, 260/78.5 BB, 260/80.73

[51] Int. Cl. .................. C08f 45/34, C08f 45/24

[58] Field of Search ... 260/29.6 TA, 33.2 R, 33.4 R, 260/80.73, 78.5 BB, 29.6 ME

[56] References Cited
UNITED STATES PATENTS

| | | | |
|---|---|---|---|
| 2,940,943 | 6/1960 | Christenson | 260/80.73 |
| 2,978,437 | 4/1961 | Christenson | 260/80.73 |
| 3,007,887 | 11/1961 | Essig | 260/29.6 |
| 3,011,993 | 12/1961 | Kapalko | 260/80.73 |
| 3,057,812 | 10/1962 | Straughan | 260/29.6 |
| 3,079,434 | 2/1963 | Christenson | 260/80.73 |
| 3,107,227 | 10/1963 | Suen | 260/29.4 |
| 3,118,852 | 1/1964 | Christenson | 260/80.73 |
| 3,163,623 | 12/1964 | Sekmakas | 260/80.73 |
| 3,380,851 | 4/1968 | Lindemann | 260/80.73 |
| 3,492,252 | 1/1970 | Euchner | 260/29.4 |
| 3,551,525 | 12/1970 | Wilhelm | 260/80.73 |
| 3,738,971 | 6/1973 | Coffman | 260/80.73 |
| 3,812,070 | 5/1974 | Kelley | 260/78.5 BB |

Primary Examiner—Allan Lieberman
Assistant Examiner—P. R. Michl
Attorney, Agent, or Firm—Dressler, Goldsmith, Clement & Gordon, Ltd.

[57] ABSTRACT

A thermosetting coating composition adapted to deposit coatings which cure on baking to provide a pencil hardness of 2H or harder, and which possess improved flexibility and impact resistance, comprising non-gelled interpolymer of monoethylenically unsaturated monomers comprising from 7–20% by weight of methylolated acrylamide, monoethylenic carboxylic acid in an amount to provide in the interpolymer a ratio of carboxyl to N-methylol functionality of from .5:1 to .9:1, and at least 50% by weight from the group of styrene, vinyl toluene and methyl methacrylate, in admixture with a polyhydric alcohol having a molecular weight of up to about 6,000, in an amount to provide a ratio of hydroxy to N-methylol functionality of from .06:1 to .6:1.

16 Claims, No Drawings

THERMOSETTING COATING COMPOSITIONS COMPRISING METHYLOLATED AMIDE INTERPOLYMERS OF HIGH ACID CONTENT IN COMBINATION WITH LOW MOLECULAR WEIGHT POLYHYDRIC ALCOHOLS

This application is a continuation-in-part of my prior application Ser. No. 204,721, filed Dec. 3, 1971 now abandoned.

The present invention relates to thermosetting coating compositions which deposit films possessing improved flexibility and impact resistance and comprising alkylolated amide interpolymers of high acid content in combination with low molecular weight polyhydric alcohols.

Alkylolated amide interpolymers typified by interpolymers containing methylolated acrylamide are known and widely used as the basis for thermosetting coating compositions, the thermosetting cure causing the desired hardness and solvent resistance to be developed in the film after it is applied. However, when it was desired to formulate such interpolymers for the deposition of cured films having a pencil hardness of 2H–3H or harder, as are desired for appliance coatings, then flexibility and impact resistance were not good, e.g., normally such cured hard coatings have been unable to withstand more than about 5 inch pounds of forward impact. Conventional alkyd-melamine thermosetting coatings formulated to cure to the same range of hardness are even less impact resistant. The thermosetting coating systems of this invention are markedly superior. At a pencil hardness of 2H–3H, the cured films produced by this invention can withstand far more than 5 inch pounds of forward impact, typically about 80 inch pounds of forward impact.

The methylolated amide interpolymers of this invention are required to include, in addition to from 7–20% of methylolated acrylamide, an amount of copolymerized monoethylenically unsaturated carboxylic acid sufficient to provide a ratio of carboxyl to N-methylol functionality of from .5:1 to .9:1. The minimum proportion of carboxylic acid is required in this invention to serve as one of the reactants in the methylolated amide interpolymer so that the desired hardness and solvent resistance will be developed when a coating composition containing the interpolymer and a polyhydric alcohol is applied as a film and cured. When sufficient acid reactant is not present, then the desired hardness and solvent resistance are not obtained, even when the curing conditions are more than sufficient to insure a complete cure.

The utilization of copolymerized monoethylenically unsaturated carboxylic acid to provide an internal catalysis is known in the prior art, it being indicated in U.S. Pat. No. 2,978,437 that from about 1 to about 30% by weight of unsaturated acid is appropriate. However, in normal practice, less than 2% by weight of acid normally provides all of the catalysis which is desired. Indeed, and in my prior U.S. Pat. No. 3,257,475, I encountered a tendency for films to overcure and become brittle at acid values in excess of 30. It is pointed out that the acid values of the interpolymers utilized herein are normally so high as to lead to brittle films were it not for the polyhydric alcohol component to be discussed hereinafter.

While the minimum ratio of carboxyl functionality to N-methylol functionality is important as noted hereinbefore, it is also significant to limit the amount of carboxyl functionality which is utilized. On this basis, the ratio of carboxyl to N-methylol groups is preferably not in excess of .9:1.

The monethylenically unsaturated carboxylic acids which may be used in accordance with the invention are illustrated by acrylic acid, methacrylic acid, crotonic acid, fumaric acid, maleic acid, itaconic acid, monobutyl maleate, and the like. These may be used alone or in admixture with one another.

The balance of the interpolymer should contain at least 50%, preferably at least 60%, based on the weight of the interpolymer, of monethylenically unsaturated monomers which provide relatively hard homopolymers, e.g., styrene, vinyl toluene, or methyl methacrylate. This insures that a properly cured film of a coating composition containing the interpolymer will possess significant hardness, e.g., 2H or harder. These monomers which induce hardness, particularly when used in an amount of 50% or more, are preferably accompanied by a small proportion, e.g., from 3–20%, preferably from 5–15%, based on the weight of the interpolymer, of an alcohol ester providing a long chain hydrocarbon terminal group, such as an ester of an alkanol containing at least four carbon atoms, and preferably at least six carbon atoms, with a monoethylenic carboxylic acid such as acrylic acid or the like. Ethylhexyl acrylate is a typical ester of the type under consideration and it will be used as illustrative. Other esters such as dodecyl acrylate or methacrylate or butyl acrylate or dioctyl maleate will further illustrate the class. The long chain terminal groups are normally chosen to include up to about 24 carbon atoms, though from 8–18 carbon atoms would be most usual. the monomers providing hard homopolymers are normally not used in an amount in excess of 85%, preferably not more than 80% of the interpolymer.

From the standpoint of the hardening monomers, styrene, preferably in an amount in excess of 60% of the weight of the copolymer, is particularly preferred since it is not only inexpensive, but it is unexpected that nonbrittle cured films can be formed from compositions including such a large proportion of styrene. Normally, polymers containing styrene in these large amounts, when cured, are hard, but hardness is accompanied by considerable brittleness.

While other monoethylenic monomers may be present in the interpolymers, such as acrylonitrile, illustrating nonreactive monomers, or hydroxyethyl methacrylate, illustrating reactive monomers, the preferred interpolymers of this invention consist essentially of the methylolated acrylamide, the monoethylenic carboxylic acid, the monomers providing hard homopolymers, and the small proportion of long chain alcohol ester.

The acrylamide is methylolated with formaldehyde, to provide the N-methylol group, either before, during, or after copolymerization. Preferably, acrylamide is methylolated by reaction with formaldehyde, conveniently in the form of paraformaldehyde, as part of the copolymerization reaction. It will be understood, however, that the acrylamide may be methylolated before copolymerization, e.g., it may be replaced by N-methylol acrylamide, or methylolation may be carried out as a separate step following completion of the copolymerization reaction.

The copolymerization reaction which is utilized is normally carried out in organic solvent solution medium, the organic solvent medium and the process of copolymerization being well known and illustrated with particularity in U.S. Pat. No. 3,163,623.

To briefly describe the solution copolymerization, the monomers are dissolved in organic solvent and copolymerized in the presence of dissolved paraformaldehyde, using conventional free radical polymerization catalysis. A small amount of amine catalyst is employed in order to minimize esterification. A small amount of an organic mercaptan is also usually used to minimize the molecular weight of the interpolymer which is formed.

Lastly, the polyhydric alcohol noted hereinbefore may be present during the copolymerization reaction even though a non-gelled interpolymer is desired which can be cured subsequently by baking after deposition in film form.

Accordingly, the thermosetting coating compositions of this invention comprise, in addition to the polyhydric alcohol component, a non-gelled interpolymer of monoethylenically unsaturated monomers comprising from 17–20% by weight of methylolated acrylamide, methylolation being effected at any time, an amount of monoethylenic carboxylic acid to provide in the interpolymer a ratio of carboxyl to N-methylol functionality of from .5:1 to .9:1, and at least 50% by weight selected from the group of styrene, vinyl toluene and methyl methacrylate.

Referring more particularly to the low molecular weight polyhydric alcohols which may be utilized in accordance with the invention, any organic polyhydric alcohol may be utilized having a molecular weight up to about 6,000. There is no lower limit of molecular weight since ethylene glycol, the lowest molecular weight polyhydric alcohol, is useful herein, but preferred materials have a molecular weight of at least about 350. The preferred polyhydric alcohols are aliphatic, and these preferably have an hydroxyl functionality of from about 2 to about 4, preferably about 3 to about 4, to insure adequate hardness, though higher functional polyhydric alcohols, such as sorbitol, are also useful, though less preferred. The polyhydric alcohols which may be utilized in this invention are further illustrated by diethylene glycol, triethylene glycol, tetraethylene glycol, propylene glycol, dipropylene glycol, polypropylene glycol 425, polypropylene glycol 1025, polypropylene glycol 2025, hexylene glycol, 2-methyl-2-ethyl-1,3-propanediol, 2-ethyl-1,3-hexanediol, 1,5-pentanediol, glycerine, 1,2,6-hexanetriol, thiodiglycol, and esterdiol having the formula $HOCH_2C(CH_3)_2-CH_3OCOC(CH_3)_2-CH_2OH$.

As will be apparent from the above, the hydroxy group is the only reactive functional group in the polyhydric alcohols contemplated, and no other group is contemplated.

Preferred polyhydric alcohols are those having higher functionality such as glycerine, and pentaerythritol and polyhydric alcohols of higher molecular weight based thereon. These are illustrated by polyethers formed by the reaction of ethylene oxide or propylene oxide with the trihydric or tetrahydric alcohol. Particularly preferred products are derivatives of glycerine, trimethylol propane, hexanetriol, or pentaerythritol having a molecular weight in the range of from 350 to 5,000. Polyethers are satisfactory, but polyesters are uniquely superior as will be established hereinafter.

While entirely organic polyhydric alcohols are preferred, part of the molecule may be inorganic as, for example, polyhydric alcohols produced by reaction of a monoepoxide such as ethylene oxide or propylene oxide with phosphoric acid or benzene phosphonic acid, or polyhydric alcohols produced in similar fashion utilizing in the reaction one of the above named glycols instead of all or a portion of the monoepoxide.

The proportion of polyhydric alcohol which is employed in accordance with the invention is rather small, a ratio of hydroxy to N-methylol of from .06:1 to .3:1 being particularly appropriate. Larger amounts up to a ratio of .6:1 may be utilized, but best results are obtained with smaller amounts as noted hereinbefore. When dihydric alcohols are used, their proportion should be minimized to insure preferred hardness.

It is desired to point out that this invention contemplates thermosetting coating solutions regardless of whether the coating is aqueous or, as is more conventional, non-aqueous, e.g., with the interpolymer in solution in an organic solvent. In some of the examples presented hereinafter, the copolymerization reaction is carried out in 2-ethoxy ethanol as the organic solvent and subsequent dilution of the resin solution is, again, with 2-ethoxy ethanol. Since 2-ethoxy ethanol is a water miscible organic solvent, the solutions produced in this invention can be dispersed in water with the aid of a base. In this connection, it will be observed that the high internal acidity which is required in this invention is normally sufficient to enable the resin solution to be dispersed in water with the aid of a base whenever the organic solvent is selected for water miscibility. On the other hand, the solvent solutions produced in this invention can be used as conventional organic solvent solution coating compositions regardless of whether or not a portion of the organic solvent is water miscible, and this will also be illustrated.

Typical organic solvents which can be utilized in order to formulate organic solution coatings, but not aqueous coatings, are mixtures of alcoholic solvents and aromatic hydrocarbon solvents, typically an approximately 50/50 weight ratio mixture of butanol with aromatic hydrocarbon solvents. On the other hand, organic solvents such as methyl ethyl ketone, acetone, 2-butoxy ethanol, and the like constitute part of the well known class of water miscible organic solvents which can be utilized when aqueous coatings are desired. Correspondingly, and from the standpoint of the polyhydric alcohol, many of the polyhydric alcohols noted hereinbefore, and especially those which are polyethers, are fully miscible in water and these can be used without modification regardless of whether the final coating solution is organic solvent based or water based.

From the standpoint of water solutions, one simply reacts a base, such as an amine, with the carboxyl content of the resin to provide water dispersibility through salt formation. The pH of the water dispersion produced in this way can vary from about 6 to about 11, but is preferably in the range of pH 7 to pH 10.

These water solutions, if they have a resin solids content in excess of about 20%, can be applied in any conventional fashion, as by spraying, brushing, dipping, or the like. On the other hand, and when the aqueous dispersion is of low solids content, e.g., about 4 to about 20%, preferably from 6–15%, then coating may be achieved through electrodeposition at the anode of a unidirectional electrical system.

The invention is illustrated in the examples which follow.

Example 1

Preparation of Acrylamide Copolymer
Procedure of Preparation

Parts by Weight
- 450 2-Ethoxy Ethanol
- 165 Polyhydric Alcohol (see Note 1)
- 30 Fumaric Acid
- 105 Paraformaldehyde
  Charge the foregoing to reactor, set reflux condenser, and heat to 115° C. using agitation.
- 135 Acrylamide
- 570 2-Ethoxy Ethanol
- 2 Triethyl Amine
- 1155 Styrene
- 130 2-Ethylhexyl Acrylate
- 52 Acrylic acid
- 6 Tertiary dodecyl mercaptan
- 16 Azobisisobutyronitrile
- 11 Benzoyl Peroxide
  Premix the above and add to reactor over a 3 hour period at 115–118° C. Hold for one hour.
- 10 Cumene-hydro-peroxide - Add and hold 1 hour.
- 10 Cumene-hydro-peroxide - Add and hold 1 hour.
- 10 Cumene-hydro-peroxide - Add and hold 1 hour. Start cooling and add:
- 675 2-Ethoxy Ethanol.

Final Characteristics
Solids  52.8%
Viscosity  Y-Z (Gardner-Holdt)
Acid Value  34.8

Note 1 — Trimethylol propane reacted with propylene oxide to produce a liquid polyoxypropylene derivative of trimethylol propane having a molecular weight of 2,540, and an hydroxyl number of 63. The hydroxyl functionality is 3, the same as for trimethylol propane. The liquid is therefore a trihydric polyether having a viscosity at 25° C. of 440 centipoises.

With reference to this example, the interpolymer includes .508 equivalents of carboxyl from the fumaric acid and .722 equivalents of carboxyl from the acrylic acid, providing a total of 1.230 equivalents of carboxyl. Since there are 1.9 equivalents of N-methylol provided by the methylolated acrylamide, this provides a ratio of carboxyl to N-methylol of .648:1.

The polyhydric alcohol, being a triol of molecular weight 2,540, provides 0.195 equivalents of hydroxyl, an hydroxyl to N-methylol of .103:1.

The interpolymer produced in this example is formulated into a pigmented coating having a total solids content of 60%, and a ratio of pigment to resin solids of 1:1, by dispersing 300 parts of titanium dioxide pigment in 135 parts of the solution of this example, together with 60 parts of additional 2-ethoxy ethanol. A high speed mixer is used to provide a uniformly dispersed paste. There is then mixed into the paste 461 parts of additional solution of this example and 97 parts of additional 2-ethoxy ethanol to provide a white pigmented coating solution having a viscosity measured in a No. 4 Ford Cup of 85 seconds.

EXAMPLE 2

To determine the function of the polyhydric alcohol component which is used in Example 1 in an amount of about 10% of the weight of the interpolymer, the polyhydric alcohol component was omitted entirely and the Example was otherwise reproduced without change.

EXAMPLE 3

To determine the function of the level of carboxyl functionality, the amount of fumaric and acrylic acids was each reduced to one-fourth the amount used in Example 1 so that the final interpolymer now possessed a ratio of carboxyl to N-methylol functionality of about .15:1, a more typical proportion of acid as used in the art. This provides an interpolymer having an acid number of about 9, which is within the preferred range of acidity disclosed in my prior U.S. Pat. No. 3,257,475 (about 1½% of the weight of the interpolymer).

EVALUATION OF THE WHITE PIGMENTED COATING SOLUTIONS OF EXAMPLES 1, 2 and 3

The white pigmented coating solutions described hereinbefore in Examples 1, 2 and 3, were applied onto zinc phosphate treated steel panels to deposit a wet coating having a thickness of about 3 mils and the coated panels were baked at 350° F. for 20 minutes. The following properties were obtained.

TABLE

|  | Example 1 | Example 2 (no polyhydric alcohol) | Example 3 (reduced acid content) |
| --- | --- | --- | --- |
| Pencil Hardness | 2H-3H | 2H-3H | H-2H |
| Impact (forward 80 inch/lb) | Pass | Fail | Pass |
| Impact (Reverse 40 inch/lb) | Pass | Fail | Pass |
| Flexibility(¼ in. Mandrel) | Pass | Complete Delamination | Pass |
| Solvent Resistance (50 methyl ethyl ketone rubs) | Pass | Pass | Very soft - loss of gloss |
| Gloss (60° Glossmeter) | 93 | 91 | 92 |
| Detergent Resistance (1% Tide at 165°F. Immersion | Pass 100 hrs. | Not tested | Fail 48 hrs. |

As will be seen from the data tabulated above, when the polyhydric alcohol component is absent, the functionality provided by the carboxyl and N-methylol functional groups is sufficient to cure the coating to provide adequate solvent resistance and also to provide adequate hardness. However, and as one might suspect from the large proportion of styrene and acid which are present in the interpolymer, the cured product possesses inadequate impact resistance and flexibility, and the adhesion to the base is so poor that the coating completely delaminates upon bending. On the other hand, and when the polyhydric alcohol content is retained and the acid content is lowered, then the functionality present in the system is inadequate to provide a full cure as evidenced by the fact that adequate solvent resistance and hardness are not obtained.

It is also interesting to note that the carboxyl functionality appears to be substantially completely consumed by the curing reaction. Thus, and despite the absence of any external catalyst, the 20 minute cure at 350° F. is ample to cause the cured film to possess excellent detergent resistance which would not be obtained if the acid functionality remained unreacted to provide sites for attack by the alkaline detergent at elevated temperature. On the other hand, when the acid content is decreased as in Example 3, the cross-link density is simply not adequate to create sufficient chemical resistance to the caustic detergent.

The results in Examples 2 and 3 can be compared with the result in Example 1 wherein the pencil hardness of 2H–3H is combined with good solvent resistance, good flexibility and impact resistance, good gloss, and good detergent resistance.

Example 4

Procedure of Preparation

Parts by Weight
```
    450   2-Ethoxy Ethanol
    105   Paraformaldehyde
     30   Fumaric Acid
    165   Polyhydric Alcohol (see Note 2)
          Charge the foregoing into a reactor equipped
          with an agitator, reflux condenser and nitrogen
          inlet tube. Heat to 115° C.
    135   Acrylamide
    670   2-Ethoxy Ethanol
      2   Triethyl Amine
   1155   Styrene
    130   2-Ethylhexyl Acrylate
     70   Acrylic Acid
     40   Azobisisobutyronitrile
     45   Tertiary dodecyl mercaptan
          Premix all the foregoing monomers, solvent and
          catalysts and add to reactor over a 3 hour
          period at 115–120°C. Hold for one hour.
     12   Cumene-hydro-peroxide - add and hold 1 hour.
     12   Cumene-hydro-peroxide - add and hold 1 hour.
     12   Cumene-hydro-peroxide - add and hold 1 hour.
    133   Dimethylethanol amine - cool and add amine.
    165   Isopropanol - add.
          Final Characteristics:
            Solids             59.5%
            Gardner Viscosity  Z₁
            Acid Value         39.6
```

Note 2 — Liquid polyoxyproylene derivative of trimethylol propane having a molecular weight of 2,570, an hydroxyl number of 63 and an hydroxy functionality of 3 (viscosity at 25° C. of 440 centipoises).

EVALUATION OF THE RESIN SOLUTION OF EXAMPLE 4 IN WATER BASED COATINGS

Preparation of water solution:
100 grams solution of resin salt of Example 4
100 grams deionized water Clear aqueous solution resulted, which contains 30% of resin solids. This aqueous resin solution was then applied using a Bird applicator onto zinc phosphate treated steel panels to deposit a wet coating having a thickness of about 3 mils, and the coated panels were baked at 350° F. for 20 minutes. The following results were obtained:

| Properties | Example 4 |
|---|---|
| Pencil hardness | 2H – 3H |
| Impact (60 inch-pounds) of forward impact | Pass |
| Flexibility (¼" mandrel) | Pass |
| Loss of adhesion after bending | None |
| Solvent resistance (100 methyl ethyl ketone rubs) | Pass |
| Gloss (60° Glossmeter) | 91 |

EXAMPLE 5

Example 4 was repeated only the polyoxypropylene derivative of trimethylol propane was replaced with a corresponding glycerine-based polyoxypropylene polyol having an average molecular weight of 3,000 and an hydroxyl number of 56.0 (functionality 3). Excellent results were obtained, which are comparable to those obtained in Example 4.

EXAMPLE 6

Example 4 was again repeated, only a polyoxypropylene derivative of propylene glycol was used, having the following characteristics:

| | |
|---|---|
| Molecular weight: | 1050 |
| Hydroxyl number: | 107 |
| Hydroxy functionality: | 2 |
| Viscosity at 25°C. | 150 centipoises. |

Coatings having excellent flexibility and 80 inch/pound impact were obtained, which had a pencil hardness of H–2H.

As previously indicated, polyhydric alcohols containing the ester group instead of the ether group are particularly contemplated. This is based on the finding that polyether-based polyhydric alcohols induce yellowing when subjected to overbaking. Thus, while the coatings are perfectly acceptable when properly baked, if the coating line is stopped for a prolonged period, and the coated products remain in the oven where they are overbaked, then a yellow cast is produced which is undesirable, especially in a white coating or in a pastel shade.

Also, and while the polyether-based systems show reasonably good detergent resistance, as previously illustrated, more vigorous testing indicates a need for superior detergent resistance, and this is supplied using internal esters, as illustrated hereinbefore, Ester-based polyhydric alcohols have already been illustrated, but polyesters based on lactones are particularly preferred, especially when the lactones contain 6 carbon atoms and are reacted with a trihydric or tetrahydric alcohol to provide an hydroxy functionality of from about 3 to about 4.

The lacton-based polyesters are in commerce and are usually based on epsilon-caprolactone which has the formula:

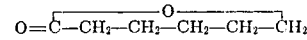

These lactones are reacted with polyhydric alcohols in known fashion to form adducts having the formula:

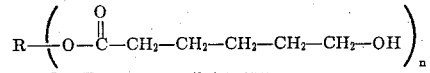

where R is the residue of an aliphatic polyhydric alcohol, preferably glycerin, pentaerythritol, trimethylol propane, or the like, and $n$ is at least 2, preferably about 3 to about 4.

Other lactones which may be used are illustrated by butyrolactone, gamma-valerolactone, beta-propiolactone, and the like. Thus, and while epsilon-caprolactone is preferred, $C_3$–$C_{14}$ lactones generally are useful.

Example 7

Preparation of Acrylamide Polymer in the Presence of Polycaprolactone Polyol

Parts by Weight
- 400 butanol
- 50 xylol
- 30 fumaric acid
- 105 paraformaldehyde Charge into reactor equipped with agitator, thermometer and Dean-Stark trap. Fill trap with xylol. Heat to 118° C.

- 135 acrylamide
- 470 butanol
- 165 caprolactone triol (molecular weight 900 - Note 3)
- 100 xylol
- 1.5 triethyl amine
- 1155 styrene
- 130 2-ethylhexyl acrylate
- 8 tertiary dodecyl mercaptan
- 52 acrylic acid
- 16 azobisisobutyronitrile
- 12 benzoyl peroxide Dissolve acrylamide in solvents. Premix monomers and catalysts and add continuously to reactor over 3 hour period. Collect water in trap (38 grams). Remove trap and hold for 1 hour at 118°–120° C.

- 12 cumene-hydro peroxide - add, hold 1 hour.
- 12 cumene-hydro peroxide - add, hold 1 hour.
- 12 cumene-hydro peroxide - add, hold 1 hour.

Cool to 100° C. and add:
- 670 xylol.

Final characteristics:
- Solids: 51.4%
- Viscosity (Gardner): V-W
- Acid Value (on solids): 35.8

Note 3 — Caprolactone Triol [NIAX Caprolactone Polyol PCP-0310 may be used (commercial product of Union Carbide Chemicals Company, New York, New York).]

| | |
|---|---|
| Functionality: | 3 |
| Melting Point, °C.: | 27–32 |
| Hydroxyl Number: | 187 |
| Viscosity at 40°C.: | 560 centistokes |
| Specific Gravity at 40°C.: | 1.084 |

The polymer of Example 7 is utilized by electrostatic spray. Therefore, in order to decrease conductivity, water is removed from the reaction media during polmerization (38 grams of water were removed).

EXAMPLE 8

Example 7 was repeated, only the 165 parts of caprolactone triol were eliminated from the monomer premix. The following final characteristics were obtained:

| | |
|---|---|
| Solids: | 49.2% |
| Viscosity (Gardner-Holdt) | W |
| Acid Value (on solids): | 35.8 |

EXAMPLE 9

Example 7 was repeated, only the 165 parts of caprolactone triol were replaced with 165 parts of polyether triol having a molecular weight of 2,670, and an hydroxyl number of 63. The following final characteristics were obtained:

| | |
|---|---|
| Solids: | 51.0% |
| Viscosity (Gardner-Holdt); | U-V |
| Acid Value (on solids): | 35.5 |

EVALUATION OF ACRYLAMIDE POLYMERS

The acrylamide polymers of Examples 7, 8 and 9 were evaluated in pigmented thermosetting coatings.

Preparation of Pigmented Coatings

Parts by Weight
- 135 polymer of Example 7
- 60 2-ethoxy ethanol solvent
- 300 titanium dioxide pigment Disperse the pigment in the resin solution using high speed mixing.

- 461 polymer of Example 7 - add
- 97 2-ethoxy ethanol solvent - add to provide a white coating having the following final characteristics:
  - Total solids: 60%
  - Pigment ratio to resin solids: 1:1
  - Viscosity (Ford Cup No. 4): 82 seconds Coatings of the above Example were then applied by a Bird applicator onto zinc phosphate treated steel panels to deposit a wet coating having a thickness of about 3 mils, and the coated panels were baked at 350° F. for 20 minutes. The results obtained are set forth in Table I below.

TABLE I

| Properties | Example 7 Caprolactone Triol | Example 8 No Triol | Example 9 Polyether Triol |
|---|---|---|---|
| Curing Cycle, Minutes | 20 | 20 | 20 |
| Curing Temperature | 350°F. | 350°F. | 350°F. |
| Pencil Hardness | 3H | 2H-3H | 2H |
| Impact (Forward 60 inch/lb.) | Pass | Fail | Pass |
| Impact (Reverse 30 inch/lb.) | Pass | Fail | Pass |
| Flexibility (1/" Mandrel) | Pass | Fail | Pass |
| Solvent Resistance (50 methyl ethyl ketone rubs) | Pass | Pass | Pass |
| Gloss (60°) | 92 | 91 | 92 |
| Detergent Resistance (1% Tide at 165°F. Immersion | Pass 200 hrs. | Pass 150 hrs. | Fail 150 hrs. |

TABLE I — Continued

| Properties | Example 7 Caprolactone Triol | Example 8 No Triol | Example 9 Polyether Triol |
|---|---|---|---|
| 5% Salt Fog Spray (500 hours exposure) | Pass 500 hrs. | Fail | Fail |
| Color retention on overbake (2 hours at 350°F.) | No discoloration | Slight discoloration | Very bad discoloration |
| Note: | Excellent chemical resistance, hardness, flexibility and color retention. Well balanced properties. | Very poor flexibility. Impact not acceptable for commerce. | Very poor discoloration. Inferior chemical resistance. Limited usage. |

Example 10

Preparation of Water Dispersible Acrylamide Polymer

Parts by Weight
- 450 2-ethoxy ethanol
- 30 fumaric acid
- 105 paraformaldehyde

Charge the above into a reactor equipped with an agitator, thermometer, and reflux condenser. Heat to 118° C.

- 135 acrylamide
- 165 caprolactone triol (note 4)
- 570 2-ethoxy ethanol
- 1.5 triethyl amine
- 1155 styrene
- 130 2-ethylhexyl acrylate
- 52 acrylic acid
- 8 tertiary dodecyl mercaptan
- 16 azobisisobutyronitrile
- 12 benzoyl peroxide Dissolve acrylamide. Premix monomers and catalysts and add over 3 hour period to reactor at 118°–120°C. Hold 1 hour.

- 12 cumene hydro peroxide - add, hold 1 hour.
- 12 cumene hydro peroxide - add, hold 1 hour.
- 12 cumene hydro peroxide - add, hold 1 hour.

Cool to 100° C. and add: 670 2-ethoxy ethanol to provide a product having the following final characteristics.

| | |
|---|---|
| Solids: | 52.1% |
| Viscosity (Gardner-Holdt): | X-Y |
| Acid value (on solids): | 35.2 |

Note 4 — Caprolactone Polyol-Triol Type [NIAX Caprolactone Polyol PCP-0300 may be used (commercial product of Union Carbide Chemicals Company, New York, New York)]

| | |
|---|---|
| Molecular weight: | 540 |
| Functionality: | 3 |
| Melting range, °C.: | 15–20 |
| Hydroxyl number: | 310 |
| Viscosity at 40°C. | 470 centistokes |
| Specific gravity at 40°C.: | 1.085 |

The polymer of Example 10 also exhibited excellent physical and chemical properties when evaluated in pigmented coatings.

EXAMPLE 11

Example 7 was repeated, only a caprolactone polyol of the diol type was used, having a molecular weight of 2,000, and an hydroxyl value of 56.1. Excellent results were also obtained utilizing this polyol.

The invention is defined in the claims which follow.

I claim:

1. A thermosetting solution coating composition comprising non-gelled solution interpolymer of monethylenically unsaturated monomers consisting essentially of from 7–20% by weight of the interpolymer of methylolated acrylamide, monethylenic carboxylic acid in an amount to provide in the interpolymer a ratio of carboxyl to N-methylol functionality of from .5:1 to .9:1, at least 50% by weight of the interpolymer from the group of styrene, vinyl toluene and methyl methacrylate, and from 3–20% by weight of the interpolymer of an ester of an alkanol containing from 4–24 carbon atoms with a monoethylenic carboxylic acid, and an aliphatic polyhydric alcohol having a molecular weight of up to about 6,000 and an hydroxy functionality of from about 2 to about 4 as the sole functionality thereof in an amount to provide a ratio of hydroxy to N-methylol functionality of from .06:1 to .6:1, said coating composition being adapted to deposit coatings which cure on baking to provide a flexible film having a pencil hardness of 2H or harder.

2. A coating composition as recited in claim 1 in which said polyhydric alcohol has a molecular weight in the range of 350–5,000.

3. A coating composition as recited in claim 1 in which said polyhydric alcohol has an hydroxy functionality of from about 3 to about 4.

4. A coating composition as recited in claim 1 in which said polyhydric alcohol includes the ester group.

5. A coating composition as recited in claim 1 in which said polyhydric alcohol is a polyester.

6. A coating composition as recited in claim 5 in which said polyester is a lactone adduct having a molecular weight in the range of 350–5,000, and an hydroxy functionality of from about 3 to about 4.

7. A coating composition as recited in claim 6 in which the ratio of hydroxy to N-methylol functionalities is in the range of from .06:1 to .3:1.

8. A coating composition as recited in claim 6 in which the lactone is a caprolactone, and it is reacted with trihydric or tetrahydric alcohol.

9. A coating composition as recited in claim 8 in which said polyhydric alcohol has the formula:

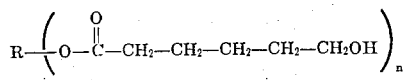

where R is the residue of an aliphatic polyhydric alcohol and $n$ is about 3 to about 4.

10. A coating composition as recited in claim 1 in which said ester is an ester of an alkanol containing 8–18 carbon atoms with a monoethylenic carboxylic acid.

11. A coating composition as recited in claim 1 in which said acid is acrylic acid.

12. A coating composition as recited in claim 1 in which the monomer components of said interpolymer are copolymerized to form said interpolymer in the presence of said polyhydric alcohol.

13. A coating composition as recited in claim 1 in which said interpolymer comprises at least 60% by weight of styrene.

14. A coating compositon as recited in claim 1 in which said interpolymer and said polyhydric alcohol are in solution in an organic solvent.

15. A coating composition as recited in claim 14 in which said organic solvent is water miscible and said interpolymer is placed in water solution with the aid of a base.

16. A coating composition as recited in claim 1 in which said interpolymer is formed by polymerization in organic solvent solution in the presence of an alkaline catalyst.

* * * * *